Patented Oct. 30, 1934

REISSUED 1,978,813

UNITED STATES PATENT OFFICE 1,978,813

RUBBER COMPOSITION AND PROCESS OF MAKING THE SAME

Edward Arthur Murphy, Erdington, Birmingham, England, assignor to Dunlop Rubber Co., Ltd., a British corporation No Drawing. Application February 11, 1932, Serial No. 592,440. In Great Britain February 20, 1931

8 Claims. (Cl. 106—23)

This invention comprises improvements in or relating to the production of compositions and goods of or containing rubber or similar material from aqueous emulsions or dispersions thereto.

The object of the invention is to produce compositions and goods of or containing rubber or similar material from aqueous emulsions or dispersions thereof, having physical properties resembling, for instance, those of gutta-percha or of leather, and which can be used as substitutes for such materials.

According to the invention the process for the production of compositions and goods of the aforesaid kinds comprises admixing thermo-plastic materials of the kinds hereinafter mentioned with aqueous emulsions or dispersions of rubber or the like of the kinds hereinafter described, prior or subsequent to their conversion into dispersions of granular precipitates in the manner herein indicated, and thereafter consolidating the dispersions of granular precipitates so produced into solid or paste-like consistency.

If desired, the dispersions of granular precipitates can be admixed with fibrous, granular or divided materials such as leather fibre, asbestos fibre, wood pulp, wood flour, jute fibre, cotton flock, paper pulp, abrasives and cork.

These fibrous, granular or divided materials can be added to the aqueous emulsions or dispersions of rubber or the like prior or subsequent to their conversion into the dispersions of granular precipitates, and prior or subsequent to the addition of the aforesaid thermo-plastic materials.

Examples of the thermo-plastic materials which when in admixture with the granular precipitates give dry consolidated products resembling gutta-percha are—carnauba wax, synthetic waxes, shellac, rosin and synthetic resins, polyvinyl esters, bitumen and mineral waxes.

The aforesaid dispersions of granular precipitates of rubber or the like are produced by a process which comprises effecting the coagulation of the aqueous dispersions hereinafter specified by precipitating in situ in the presence of a relatively large quantity of water one or more compounding ingredients of a nature hereinafter described, by the interaction or double decomposition of one or more water soluble reagents having normally no coagulating effects upon the aforesaid dispersions, with one or more water soluble reagents an ion of which may incidentally possess coagulating influence subsequently added thereto, whereupon the aforesaid dispersions are transformed into dispersions of granular precipitates.

Examples of the water-soluble reagents of the first class having normally no coagulating effects upon the dispersions are—carbonates, sulphates, silicates of the alkali metals or of ammonium.

Examples of the water soluble reagents of the second class which interact with the water soluble reagents of the first class to produce insoluble compounding ingredients are soluble salts of magnesium, aluminium, calcium, barium or zinc; sodium silicate also falls into this class if the corresponding reagent in the first class is such as to precipitate silicic acid—e. g. ammonium carbonate.

By a suitable choice of the reagents and consequent reaction products dispersions of varying consistency can be formed.

If desired, the granular precipitates can be washed free from soluble reaction products such as soluble sulphates or chlorides by known means such as filtration and washing prior to their consolidation.

Numerous substances are capable of being used as compounding ingredients, for example, carbonates of magnesium, calcium and zinc may be prepared from sodium carbonate and sulphates or chlorides of these metals. Similarly the silicates of magnesium and zinc can be prepared from sodium silicate and the corresponding sulphate or chloride.

Mixtures of precipitates may be prepared and the reactions may be chosen in such a manner that only one soluble reaction product results for two insoluble products, for example, the reaction between one equivalent of sodium carbonate and one of magnesium sulphate followed by one equivalent of barium chloride yields only one equivalent of sodium chloride for two equivalents of mixed precipitate. In this manner a large yield of precipitate may be obtained relative to the amount of soluble salt to be removed.

The reagents may be added in the form of their aqueous solutions and may contain protective colloids such as glue, gum acacia, in solution, to increase the fineness of subdivision of the precipitated compounding ingredients.

The rate at which coagulation takes place after the introduction of the water soluble reagents of the second class may be controlled by the addition of suitable substances, for example casein.

The emulsions or dispersions of rubber or the like comprise those consisting of rubber, gutta-percha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another. Any of the aforesaid dispersions may contain the usual known compounding and vulcanizing ingredients and/or may be in concentrated form.

Concentrates such as are obtained in U. S. Patent 1,846,164, February 23, 1932, and in British Patent 219,635 to which may be added any one or more of the usual compounding ingredients may also be used.

The aforesaid vulcanizing and other compounding ingredients which are added in the form of their dispersions may be added to the aforesaid aqueous emulsions or dispersions of rubber or the like prior or subsequent to the formation of the dispersions of granular precipitates.

It is preferable to add the aforesaid dispersions of the vulcanizing and other compounding ingredients before the formation of the dispersions of granular precipitates.

The dispersions of granular precipitates having admixed therein the aforementioned thermo-plastic materials produced according to the present invention can for instance be consolidated into homogeneous sheet and dried. Articles may be moulded from said dry sheets for example hemispherical cups to form the shells of golf balls.

Alternatively, the aforesaid dispersions of granular precipitates containing thermo-plastic materials can be applied in a pasty condition, for example to the inner core of a golf ball, and the deposits dried and pressed at a temperature not exceeding 100 degrees C.

As a third example of preparing moulded products from the dispersions of granular precipitates containing thermo-plastic materials, for instance golf ball shells can be produced by immersing a hemispherical filter mould into the dilute dispersions of granular precipitates, and applying suction to the interior of the mould, thereby producing a cuplike deposit which may be dried and moulded to the core of the ball.

The following is given by way of example, as to how the process can be effected for the production of compositions or goods having properties resembling gutta-percha.

An aqueous dispersion of the following composition:—

| | Parts by weight |
|---|---|
| Rubber | 50 |
| Colloidal magnesium | |
| Silicate | 20 |
| Carnauba wax | 20 |
| Casein | 0.5 |

0.5 parts by weight of casein in the form of a 5% aqueous ammoniacal solution are added to 8.4 parts of rubber latex of 64% concentration produced by centrifugalization. 24.4 parts of sodium silicate in the form of a 5% solution is also added as well as 20 parts by weight of carnauba wax in the form of a 20% aqueous dispersion.

24 parts by weight of magnesium sulphate as a 5% solution are then stirred in when precipitation occurs. The combined precipitate comprising the granular precipitate is then filtered and consequently consolidated in any of the manner hereinbefore indicated.

What I claim is:

1. A process for producing rubber compositions of gutta percha or leather-like qualities which comprises admixing an aqueous dispersion of non-rubber thermo-plastic materials with aqueous suspensions of finely divided granular precipitates of rubber and water insoluble inert inorganic compounding ingredients in a homogeneous mixed precipitate with said rubber, and thereafter separating said thermo-plastic materials and said rubber materials from the aqueous dispersing medium while intimately mixed therein.

2. A process of producing gutta percha-like or leather-like products which comprises adding to an aqueous dispersion of rubber a water soluble reagent having normally no coagulative effect upon the dispersion, then adding a reagent to form a water insoluble inert inorganic compounding ingredient by inter-action with said first reagent and having ions which possess coagulating influences upon the aforesaid dispersion sufficient to coagulate said dispersion to an easily washable crumb-like form, and thereafter compacting said precipitate in intimate contact with a thermo-plastic non-rubber material.

3. A process of producing gutta percha-like or leather-like products which comprises adding to an aqueous dispersion of rubber material a water soluble reagent having normally no coagulative effect upon said dispersion, and then adding a second reagent to form a water insoluble inert inorganic compounding ingredient by inter-action with said first reagent and having ions that possess coagulating influences upon the aforesaid dispersion sufficient to coagulate said dispersion to easily washable crumb-like form, then admixing with said precipitate while suspended in an aqueous medium a dispersion of thermo-plastic non-rubber material, and thereafter separating the aqueous medium from said mixture and compacting the latter.

4. A process for producing gutta percha-like or leather-like products which comprises adding to an aqueous dispersion of rubber material a water soluble reagent having normally no coagulative effect upon the dispersion, then adding a reagent to form a water insoluble inert inorganic compounding ingredient by inter-action with said first reagent and having ions that possess coagulating influences upon the aforesaid dispersion sufficient to coagulate said dispersion to an easily washable crumb-like form, admixing with said precipitate while suspended in an aqueous medium an aqueous dispersion of a thermo-plastic non-rubber material and a suspension of finely divided material, and separating the aqueous medium from the resulting mixture to compact the suspended and dispersed materials in an intimately mixed homogeneous structure.

5. The process of claim 4 in which the divided material is fibrous.

6. The process of claim 4 in which the fibrous material is granular.

7. The process of claim 3 in which said thermo-plastic non-rubber material is water insoluble.

8. The method of claim 3 in which said thermo-plastic non-rubber material is carnauba wax.

EDWARD ARTHUR MURPHY.